J. W. JONES.
APPARATUS FOR DETERMINING THE DEPTH OF LIQUIDS.
APPLICATION FILED DEC. 13, 1906.
922,284.
Patented May 18, 1909.
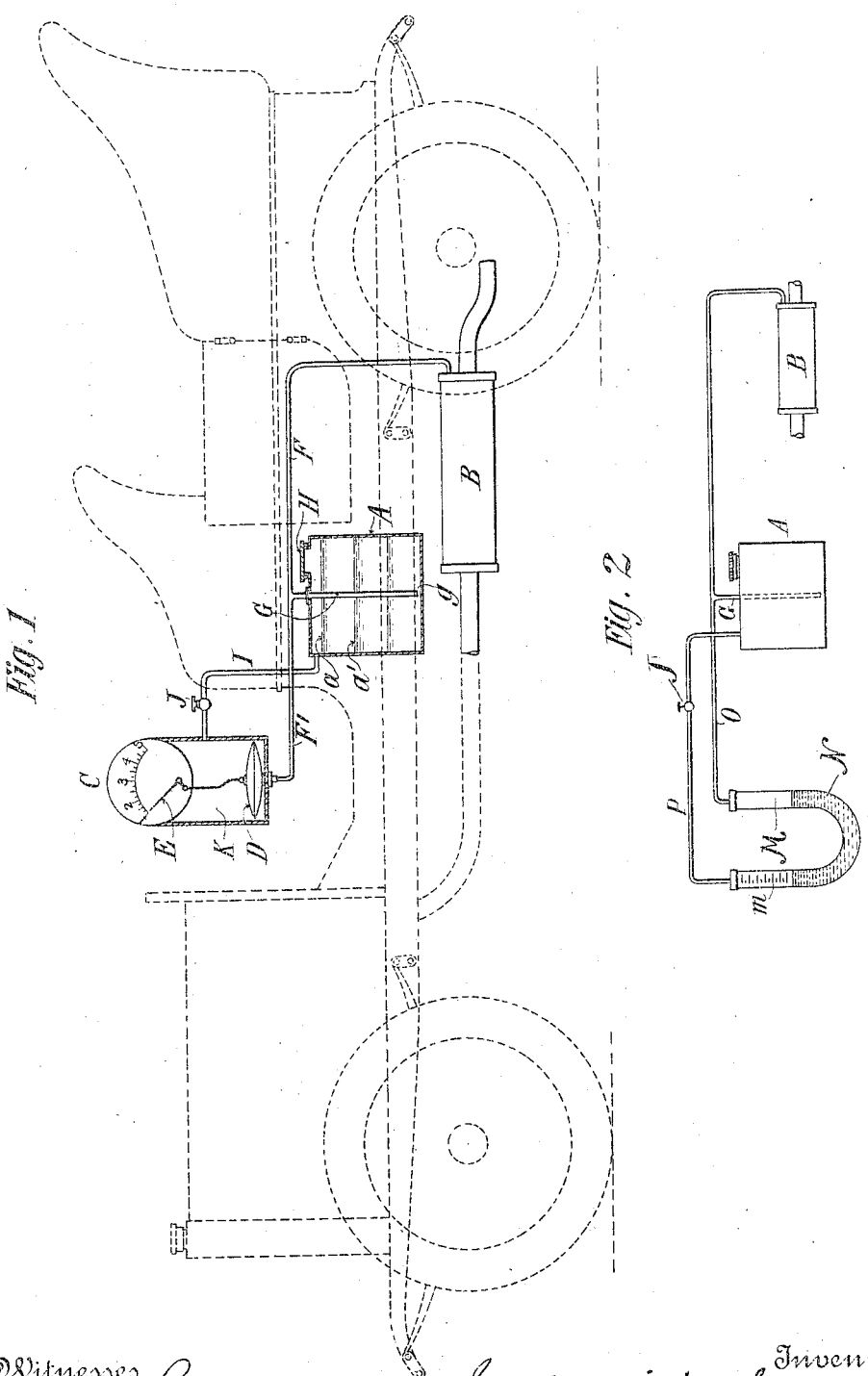

UNITED STATES PATENT OFFICE.

JOSEPH WILLIAM JONES, OF NEW YORK, N. Y.

APPARATUS FOR DETERMINING THE DEPTH OF LIQUIDS.

No. 922,284.  Specification of Letters Patent.  Patented May 18, 1909.

Application filed December 13, 1906. Serial No. 347,670.

*To all whom it may concern:*

Be it known that I, JOSEPH WILLIAM JONES, a citizen of the United States of America, and a resident of New York city, New York, have invented a new and useful Improvement in Apparatus for Determining Depth of Liquids, which improvement is fully set forth in the following specification.

The principal purpose of my invention is to indicate the quantity of gasolene in the gasolene tank of an automobile, although of course it may be used for determining the amount of any other liquid in some other kind of tank. The invention may also be used as an adjustable safety valve.

The invention consists broadly in forcing to the bottom of the tank, by pressure, a column of the liquid to be measured and determining the depth of the column by measuring that pressure; it consists specifically in employing a pressure-gage in connection with a source of pressure (as the exhaust of the automobile engine), and in having the passage-way or duct between the two provided with an automatic blow-off (or safety-valve) which consists of a column of the gasolene or other liquid to be measured, so that all the pressure above a certain amount will thereby escape and not be recorded by the pressure-gage, and the amount which is recorded corresponds exactly with the quantity or amount of the gasolene in the tank.

The invention will be best understood by reference to the accompanying drawings, in which—

Figure 1 is a diagrammatic view of parts illustrating the invention as applied to an automobile, the latter shown in dotted lines; and Fig. 2 is a detail of a modification.

A represents the gasolene-tank, B the exhaust of the engine, and C represents the pressure-gage as a whole. This latter comprises, as one form, a diaphragm-bellows D that is connected to the pivoted pointer E, so that inflation of the bellows causes the pointer to pass over the dial-face; the dial-face itself is calibrated in feet and inches (to indicate the depth of liquid in tank A (or in gallons and fraction of a gallon (to indicate the quantity of liquid in the tank), or both.

K represents an air-tight casing that incloses the bellows D.

F—F' is a duct leading from the exhaust B to the interior of bellows D; it is preferably a small copper tube, and will be referred to as the main duct. G is a duct, preferably a similar copper tube, leading from the duct F—F' to a point very near the bottom of the tank A. It is preferably in a vertical position and will be termed the branch duct. H represents a cover by which the orifice of tank A may be hermetically closed when desired. I is another duct, which may be similar to the main and branch ducts, leading from a point near the top of tank A to the inclosed space K. It is provided with the stop-cock or valve J, and will be referred to as the secondary duct.

The cover H may be left open and the gasolene will be under atmospheric pressure only, or the cover H may be closed tight and pressure applied to the gasolene, as desired. My present apparatus is designed to operate under either condition. When the cover H is open, the stop-cock J will be closed to cut off communication between the tank A and the space K. Assume that the weight of the liquid to be measured, for a column 1 foot high, is 1 pound per square inch, then the weight of a column 2 feet high would be 2 pounds per square inch, etc. Assuming that the gasolene in the tank reaches to the level $a$, which is just 3 feet above the orifice $g$ of the branch duct G, then if the pressure at the exhaust B be anything short of 3 pounds per square inch, the column of liquid in duct G will be forced down, but not entirely to the bottom of the duct, while the pressure throughout the space consisting of F—F'—D—G will be everywhere the same, something short of 3 pounds per square inch. If the pressure reaches to, and stands constant at exactly 3 pounds, then the column of liquid will be driven entirely out of duct G, and no more. And, as soon as the pressure exceeds 3 pounds per square inch, all the excess will pass out through the body of the liquid in the tank and escape through the orifice at H; but the pressure throughout the space F—G—F'—D will remain everywhere the same—exactly 3 pounds per square inch; and the pointer E will indicate this amount upon the dial-face, either by showing "3 feet" or the amount of liquid, as may be preferred, or both. When the level of the gasolene is lowered, as (say) 1 foot, or to $a'$, then the weight of the column contained in the duct G will be only 2 pounds per square inch; the maximum pressure throughout the pressure-space is only 2 pounds per square inch; the pointer E indicates accordingly; and the excess of pressure from exhaust B is passing out as before, at the orifice H. Thus, whatever be the depth of liquid in the tank, the amount of pressure required to empty the duct G will be indicated by pointer E, and all the rest of the pressure will pass out into the atmosphere.

If it be desired to employ pressure upon the gasolene, the orifice H will be closed and the valve J opened. The pressure from the exhaust B extends into ducts F—F'—G as before; and as before the pressure exerted inside of bellows D cannot exceed the amount of pressure required to empty the duct G,—because when the pressure from the exhaust is greater than is necessary to empty column G, the excess bubbles up through the liquid into the space in the top of the tank, thence into the casing K. As this excess continues to pass through, there is created in space I—K a back-pressure, which is exerted upon the surface $a$ of the liquid in the tank (and also upon the outside—or reverse—of bellows D). As this back-pressure increases, the amount of the "original" pressure necessary to pass through the duct G is increased by the same amount. Thus, assuming a pressure at exhaust B of 10 pounds per square inch (these figures are given only for the sake of illustration), and assuming that there is 3 feet of gasolene in the reservoir, which weighs 1 pound per square inch per foot deep,—then in the beginning there will be a pressure on the inside of bellows D amounting to 3 pounds and the excess of pressure will be passing through duct I into space K. When this excess exerts a back-pressure on the surface of the reservoir amounting to (say) 1 pound per square inch, then it will require a pressure of 4 pounds per square inch to force its way through duct G; consequently there is a pressure of 4 pounds per square inch on the inside of the bellows D, and a counter-pressure of 1 pound per square inch on the outside; so that the net result is a distending of the bellows to an extent of only 3 pounds. And so on for any pressures, "original" or "back"; the net result, or difference between such original pressure and such back pressure, will be precisely the amount normally required to empty column G; and precisely this amount will be indicated by pointer E.

Fig. 2 shows a modified form of pressure-gage, consisting of a U-shaped tube M of glass, containing a colored liquid N, and having graduations calibrated thereon as at $m$. O is a duct corresponding to duct F' in Fig. 1, and P is a duct corresponding to duct I in Fig. 1. The pressure required to empty the column G will be registered by forcing the liquid downward on the right side of tube M, thereby causing it to rise on the left hand member thereof where the indications may be read. If the gasolene be under pressure, the valve J in duct P will be opened, and the operation of the gage is obvious.

Other forms of pressure-gages may be employed as found convenient. If the tank A be rectangular, the amount of liquid contained will vary directly as the depth; and the dial-face may be calibrated to show both depth of liquid in feet and inches and quantity of liquid in gallons etc.; but if the tank be of some other shape the quantity may not vary directly as the depth, yet the dial-face may be calibrated to indicate the quantities for the particular tank used. The tank A may be located wherever convenient, while the pressure-gage will be placed wherever desired, preferably on the dashboard. It is obvious that there is the utmost flexibility in the arrangement and location of the parts of the invention.

Having thus described my invention, I claim:

1. The combination with a tank containing a liquid to be measured and having a removable air-tight closure, a pressure gage, an air-tight casing surrounding the same, and a source of pressure, of a continuous duct leading directly from said source of pressure to said gage, a branch duct leading from said main duct to the bottom of said tank, and a valve-controlled secondary duct leading from the top of said tank to said casing.

2. In combination, a liquid fuel supply tank for self-propelling vehicles, a differential pressure gage and a source of fluid pressure, said gage having two compartments separated by a flexible diaphragm, a conduit connecting said pressure supply with one of said compartments and having a branch pipe leading to the bottom of said tank, and an equalizing pressure conduit provided with a valve connecting said second compartment with the top of said tank.

3. In combination, a liquid fuel supply tank for self-propelling vehicles, and a differential pressure gage having two compartments separated by a flexible diaphragm, a conduit connecting one of said compartments with said tank near its bottom, and adapted to connect with the engine exhaust, and a conduit connecting said second compartment with the space above the liquid in said tank.

In testimony whereof I have signed this specification in the presence of two subscribing witnesses.

JOSEPH WILLIAM JONES.

Witnesses:
 C. A. L. MASSIE,
 R. L. SCOTT.